United States Patent
Racusin

(10) Patent No.: US 11,354,758 B2
(45) Date of Patent: ***Jun. 7, 2022

(54) ONLINE SYSTEM FOR RETAIL GAS SALES

(71) Applicant: Michael A. Racusin, Chicago, IL (US)

(72) Inventor: Michael A. Racusin, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,789

(22) Filed: Apr. 22, 2020

(65) Prior Publication Data
US 2021/0279821 A1   Sep. 9, 2021

Related U.S. Application Data

(63) Continuation of application No. 16/730,109, filed on Dec. 30, 2019, now Pat. No. 10,664,932.

(51) Int. Cl.
*G06Q 50/06* (2012.01)
*G06Q 20/14* (2012.01)
(Continued)

(52) U.S. Cl.
CPC ........... *G06Q 50/06* (2013.01); *G06Q 20/145* (2013.01); *G06Q 20/28* (2013.01); *G06Q 30/04* (2013.01)

(58) Field of Classification Search
CPC ..... G06Q 30/0601–0645; G06Q 30/80; G06Q 20/145; G06Q 30/0207
(Continued)

(56) References Cited

U.S. PATENT DOCUMENTS 5,500,890 A   3/1996   Rogge et al.
6,222,463 B1 *   4/2001   Rai ........................ G08G 1/20
                                                    342/51
(Continued)

FOREIGN PATENT DOCUMENTS

CA   2684118        4/2011
CA   2684118 A1 *  4/2011   ............. G06Q 20/04
(Continued)

OTHER PUBLICATIONS

Bock, L. (Jul. 24, 2000). Lock-in prices offered: [ALL edition]. Telegram & Gazette Retrieved from https://www.proquest.com/newspapers/lock-prices-offered/docview/268764280/se-2?accountid=14753 (Year: 2000).*
(Continued)

*Primary Examiner* — Ashford S Hayles
(74) *Attorney, Agent, or Firm* — Clark Hill PLC

(57) ABSTRACT

A method and system is disclosed that enables purchasers to purchase gas online for future delivery. The invention requires the purchaser prepay for online purchases or have been extended credit accepted by an oil company. The prepayments are credited to the purchaser's account. For each retail gas delivery, the oil company handles the online gas purchase transaction and reimburses the retail gas station owner for the online purchase. Specifically, the oil company reimburses the retail gas station owner for the taxes and profit on the gas delivered to the purchaser and also replaces the amount of gas delivered. In this way, the retail gas station owner is made whole for each delivery. Oil company also benefits with increased gas sales, increased profit and increased cash flow.

Various embodiments of the invention are contemplated. The invention may require a purchaser to select a location of a retail gas station, a selected grade of gas or a combination of both.

9 Claims, 9 Drawing Sheets

(51) Int. Cl.
    *G06Q 30/04*      (2012.01)
    *G06Q 20/28*      (2012.01)
(58) Field of Classification Search
    USPC ..... 705/26.1, 26.2, 26.25, 26.3, 26.35, 26.4,
        705/26.41, 26.42, 26.43, 26.44, 26.5,
        705/26.6, 26.61, 26.62, 26.63, 26.64,
        705/26.7, 26.8, 26.81, 26.82, 26.9, 27.1,
        705/27.2
    See application file for complete search history.

(56)         References Cited

U.S. PATENT DOCUMENTS

| | | | |
|---|---|---|---|
| 6,332,128 B1 | 12/2001 | Nicholson | |
| 6,505,106 B1* | 1/2003 | Lawrence | G01M 15/05 |
| | | | 701/32.4 |
| 6,751,475 B1* | 6/2004 | Holmes | H04M 1/6091 |
| | | | 455/406 |
| 6,813,609 B2 | 11/2004 | Wilson | |
| 6,856,820 B1* | 2/2005 | Kolls | B60R 25/1004 |
| | | | 455/66.1 |
| 6,894,601 B1* | 5/2005 | Grunden | G07C 5/008 |
| | | | 340/5.72 |
| 6,980,960 B2 | 12/2005 | Hajdukiewicz et al. | |
| 7,155,322 B2* | 12/2006 | Nakahara | G07C 5/008 |
| | | | 340/439 |
| 7,249,039 B2* | 7/2007 | Yoshioka | G06Q 30/02 |
| | | | 705/4 |
| 7,742,942 B2 | 6/2010 | Nicholson | |
| 7,970,644 B2* | 6/2011 | Hedley | G07B 15/063 |
| | | | 705/13 |
| 8,019,694 B2 | 9/2011 | Fell et al. | |
| 8,025,226 B1* | 9/2011 | Hopkins, III | B60R 25/00 |
| | | | 235/384 |
| 8,065,218 B2 | 11/2011 | Fell et al. | |
| 8,086,517 B2 | 12/2011 | Fell et al. | |
| 8,156,022 B2 | 4/2012 | Fell et al. | |
| 8,160,952 B1 | 4/2012 | Fell et al. | |
| 8,190,533 B2 | 5/2012 | Dickman | |
| 8,370,254 B1* | 2/2013 | Hopkins, III | G06K 19/044 |
| | | | 705/35 |
| 8,407,144 B2* | 3/2013 | Roberts | G06Q 20/102 |
| | | | 705/40 |
| 8,417,598 B2* | 4/2013 | Pinkusevich | G06Q 30/04 |
| | | | 320/109 |
| 8,504,465 B2 | 8/2013 | Kirch et al. | |
| 9,080,529 B1* | 7/2015 | Klughart | B60R 16/0236 |
| 9,563,893 B2 | 2/2017 | Lamb et al. | |
| 9,706,354 B2* | 7/2017 | Enriquez | G06Q 20/40145 |
| 10,467,623 B2* | 11/2019 | Purves | G06Q 20/3821 |
| 10,664,932 B1 | 5/2020 | Racusin | |
| 2001/0049626 A1 | 12/2001 | Nicholson | |
| 2002/0016655 A1* | 2/2002 | Joao | G07C 5/085 |
| | | | 701/33.4 |
| 2002/0020742 A1 | 2/2002 | Streicher et al. | |
| 2002/0032506 A1* | 3/2002 | Tokitsu | G07C 5/008 |
| | | | 701/32.4 |
| 2002/0097178 A1* | 7/2002 | Thomas, Jr. | G06Q 30/04 |
| | | | 705/13 |
| 2002/0101363 A1* | 8/2002 | Ogura | G07C 9/23 |
| | | | 340/932.2 |
| 2002/0190118 A1* | 12/2002 | Davenport | G07F 7/025 |
| | | | 235/375 |
| 2003/0050095 A1* | 3/2003 | Chen | G06Q 20/12 |
| | | | 455/557 |
| 2003/0069673 A1* | 4/2003 | Hong | B60R 25/2081 |
| | | | 701/33.3 |
| 2003/0069784 A1* | 4/2003 | Banerjee | G06Q 30/04 |
| | | | 705/13 |
| 2003/0197060 A1* | 10/2003 | Coyner | G07F 7/02 |
| | | | 235/381 |
| 2004/0036584 A1* | 2/2004 | Briick | B60R 25/257 |
| | | | 340/5.2 |
| 2004/0260632 A1* | 12/2004 | Wanasek | G06Q 30/02 |
| | | | 705/30 |
| 2005/0033694 A1* | 2/2005 | Perrin | G06Q 20/04 |
| | | | 705/44 |
| 2005/0102075 A1* | 5/2005 | Dar | G06Q 40/08 |
| | | | 701/31.4 |
| 2005/0125669 A1* | 6/2005 | Stewart | H04L 63/061 |
| | | | 713/171 |
| 2005/0203673 A1* | 9/2005 | El-Hajj | G06Q 10/08 |
| | | | 701/1 |
| 2005/0216139 A1 | 9/2005 | Laughlin et al. | |
| 2006/0086787 A1 | 4/2006 | Roy et al. | |
| 2006/0293952 A1* | 12/2006 | Nicholson | G06Q 30/0219 |
| | | | 705/14.36 |
| 2007/0061069 A1* | 3/2007 | Christensen | H04W 64/00 |
| | | | 701/1 |
| 2007/0225912 A1* | 9/2007 | Grush | G06Q 20/127 |
| | | | 701/469 |
| 2007/0267482 A1* | 11/2007 | Ruckart | G06Q 20/28 |
| | | | 235/375 |
| 2007/0276738 A1 | 11/2007 | Rajunas, III | |
| 2008/0015964 A1* | 1/2008 | Shuster | G06Q 40/06 |
| | | | 705/36 R |
| 2008/0040210 A1* | 2/2008 | Hedley | G06Q 30/04 |
| | | | 382/104 |
| 2008/0208656 A1* | 8/2008 | Matsubara | G06Q 10/06375 |
| | | | 705/7.38 |
| 2008/0208680 A1* | 8/2008 | Cho | G06Q 20/32 |
| | | | 705/13 |
| 2008/0313013 A1 | 12/2008 | Fell et al. | |
| 2009/0024525 A1* | 1/2009 | Blumer | G06Q 20/10 |
| | | | 705/41 |
| 2009/0157566 A1* | 6/2009 | Grush | G06Q 30/0283 |
| | | | 705/400 |
| 2009/0289113 A1* | 11/2009 | Vilnai | G06Q 20/206 |
| | | | 705/41 |
| 2010/0030461 A1* | 2/2010 | Maekawa | G01C 21/36 |
| | | | 701/420 |
| 2010/0057624 A1* | 3/2010 | Hurt | G06Q 20/3223 |
| | | | 705/76 |
| 2010/0073124 A1* | 3/2010 | Mahalingaiah | G07C 5/006 |
| | | | 340/5.1 |
| 2010/0076878 A1* | 3/2010 | Burr | G07B 15/063 |
| | | | 701/123 |
| 2010/0088127 A1* | 4/2010 | Betancourt | G06Q 10/02 |
| | | | 705/26.1 |
| 2010/0114616 A1* | 5/2010 | Touati | G07B 15/00 |
| | | | 701/2 |
| 2010/0115093 A1* | 5/2010 | Rice | G05B 15/02 |
| | | | 709/224 |
| 2010/0115505 A1* | 5/2010 | Touati | G07C 5/008 |
| | | | 709/248 |
| 2010/0161481 A1* | 6/2010 | Littrell | B60L 53/665 |
| | | | 705/40 |
| 2010/0228608 A1* | 9/2010 | Hedley | G08G 1/0175 |
| | | | 705/13 |
| 2010/0262555 A1 | 10/2010 | Dickman | |
| 2010/0273543 A1* | 10/2010 | Weitzhandler | H01Q 1/2216 |
| | | | 455/575.7 |
| 2010/0280956 A1* | 11/2010 | Chutorash | G06Q 20/202 |
| | | | 705/64 |
| 2010/0287038 A1* | 11/2010 | Copejans | G01S 19/14 |
| | | | 342/357.29 |
| 2010/0325049 A1* | 12/2010 | Tanaka | G06Q 10/06 |
| | | | 235/487 |
| 2010/0332363 A1* | 12/2010 | Duddle | G06Q 40/12 |
| | | | 705/41 |
| 2011/0035049 A1* | 2/2011 | Barrett | G07F 7/0873 |
| | | | 700/232 |
| 2011/0099055 A1* | 4/2011 | Khalil | G06Q 30/0207 |
| | | | 705/14.1 |
| 2011/0133952 A1* | 6/2011 | McNamara | G08G 1/096775 |
| | | | 340/936 |
| 2011/0215897 A1* | 9/2011 | Simpson | G05B 19/00 |
| | | | 340/5.1 |

(56) References Cited

U.S. PATENT DOCUMENTS

| | | | | |
|---|---|---|---|---|
| 2011/0231310 | A1* | 9/2011 | Roberts | G06Q 20/102 382/115 |
| 2011/0237186 | A1* | 9/2011 | Preissinger | B60R 16/037 455/41.1 |
| 2011/0288721 | A1* | 11/2011 | Christensen | B60L 53/305 701/29.5 |
| 2012/0109797 | A1* | 5/2012 | Shelton | B60L 3/0069 700/297 |
| 2012/0172010 | A1* | 7/2012 | Oman | G07C 5/008 455/414.1 |
| 2012/0191524 | A1* | 7/2012 | Ambrosio | B60L 53/64 705/14.23 |
| 2012/0203643 | A1 | 8/2012 | Levene et al. | |
| 2012/0209579 | A1* | 8/2012 | Fansler | G06Q 10/04 703/8 |
| 2012/0323771 | A1* | 12/2012 | Michael | G06Q 40/00 705/39 |
| 2013/0065576 | A1* | 3/2013 | Basir | H04L 67/06 455/419 |
| 2013/0085928 | A1* | 4/2013 | McKinney | G06Q 20/3278 235/487 |
| 2013/0103585 | A1* | 4/2013 | Carapelli | H04W 84/10 705/44 |
| 2013/0132286 | A1* | 5/2013 | Schaefer | G06Q 10/06 705/305 |
| 2013/0138460 | A1* | 5/2013 | Schumann, Jr. | G06Q 50/30 705/4 |
| 2013/0198074 | A1 | 8/2013 | Cox et al. | |
| 2013/0300582 | A1* | 11/2013 | McNamara | H04W 4/029 340/905 |
| 2014/0019170 | A1* | 1/2014 | Coleman | G06Q 10/10 705/4 |
| 2014/0039999 | A1* | 2/2014 | Levene | G06Q 20/0855 705/16 |
| 2014/0058805 | A1* | 2/2014 | Paesler | G06Q 20/32 705/13 |
| 2014/0068713 | A1* | 3/2014 | Nicholson | H04W 12/06 726/3 |
| 2014/0136329 | A1* | 5/2014 | Chang | G06Q 40/02 705/14.62 |
| 2014/0195047 | A1* | 7/2014 | King | H04L 9/3226 141/1 |
| 2014/0222533 | A1 | 8/2014 | Ovick et al. | |
| 2014/0244413 | A1* | 8/2014 | Senior | G06Q 20/201 705/37 |
| 2014/0305545 | A1* | 10/2014 | Butler, Jr. | G07F 13/025 141/94 |
| 2015/0058224 | A1* | 2/2015 | Gaddam | G06Q 20/327 705/44 |
| 2015/0143116 | A1* | 5/2015 | Tang | G06Q 20/18 713/168 |
| 2015/0161590 | A1* | 6/2015 | Genovez | G06Q 20/3278 705/44 |
| 2015/0168172 | A1* | 6/2015 | Roth | G01C 21/3679 701/123 |
| 2015/0170151 | A1* | 6/2015 | Lamb | G06Q 30/0269 705/44 |
| 2015/0220916 | A1* | 8/2015 | Prakash | G06Q 20/40 705/41 |
| 2015/0242969 | A1* | 8/2015 | Pallas | B67D 7/145 705/39 |
| 2015/0278788 | A1* | 10/2015 | Manuel | G06Q 20/327 705/21 |
| 2015/0332359 | A1* | 11/2015 | Ayala | G06Q 30/06 705/26.25 |
| 2016/0035001 | A1* | 2/2016 | Driscoll | G06Q 30/0631 705/26.7 |
| 2016/0035013 | A1* | 2/2016 | Plattenburg | G06Q 30/0641 705/27.1 |
| 2016/0055467 | A1* | 2/2016 | Racusin | G06Q 20/145 705/14.1 |
| 2016/0063531 | A1 | 3/2016 | Rahhal | |
| 2016/0350726 | A1* | 12/2016 | Lee | G06Q 10/20 |
| 2017/0073211 | A1* | 3/2017 | Wilson | B67D 7/348 |
| 2017/0116600 | A1* | 4/2017 | Sharan | G06Q 20/3674 |
| 2017/0127230 | A1* | 5/2017 | Enriquez | G07B 15/063 |
| 2017/0221116 | A1* | 8/2017 | Makke | G06Q 30/0609 |
| 2017/0364896 | A1 | 12/2017 | Racusin | |
| 2018/0005258 | A1 | 1/2018 | Pulley | |
| 2018/0018664 | A1* | 1/2018 | Purves | G06Q 20/385 |
| 2018/0053178 | A1* | 2/2018 | Shah | G06Q 20/32 |
| 2019/0114867 | A1* | 4/2019 | Racusin | G07F 13/02 |
| 2019/0210864 | A1 | 7/2019 | Racusin | |
| 2019/0318426 | A1* | 10/2019 | Favereau | G06Q 20/4014 |
| 2019/0333168 | A1* | 10/2019 | Racusin | G06Q 20/387 |
| 2020/0079320 | A1* | 3/2020 | Lacoss-Arnold | B60R 25/2081 |
| 2020/0311716 | A1* | 10/2020 | Ravi | G06Q 20/363 |
| 2021/0279821 | A1* | 9/2021 | Racusin | G06Q 20/0855 |

FOREIGN PATENT DOCUMENTS

| | | | | |
|---|---|---|---|---|
| JP | 2004001787 A | * | 1/2004 | |
| KR | 20020074964 | | 10/2002 | |
| KR | 20100004403 A | * | 1/2010 | |
| WO | 01/16905 | | 3/2001 | |
| WO | WO-2008057847 A2 | * | 5/2008 | G06Q 20/18 |
| WO | WO-2008142423 A2 | * | 11/2008 | B67D 7/348 |
| WO | WO-2009030032 A1 | * | 3/2009 | G06Q 30/02 |
| WO | WO-2010008265 A1 | * | 1/2010 | G01D 4/00 |
| WO | WO-2013126789 A1 | * | 8/2013 | G06Q 20/201 |
| WO | WO-2016127290 A1 | * | 8/2016 | G06Q 20/32 |

OTHER PUBLICATIONS

The Fuel Trading Company Ltd ./Portland Fixed Price Fuel Card; Screenshots from https://wwwportland-fuelcard.co.uk/.

Broida, R "Save on every gallon of gas with this discounted GasBuddy membership"; Article [online], Jul. 26, 2018 [retrieved Nov. 1, 2019], Retrieved from the internet: <URL: https://www.cnet.com/news/save-on-every-gallon-of-gas-with-this-discounted-gasbuddy-membership/>; pp. 1-2.

Goldman, D "5 best apps to find cheap gas"; Article [online]. Dec. 29, 2014 [retrieved Nov. 1, 2019], Retrieved from the internet: <URL: https://money.cnn.com/2014/12/29/technology/mobile/gas-price-apps/index.html>; entire document.

Francella, Barbara Grondin, "Priceline Gets into the Gasoline Biz," Convenience Store News, 36.5:14, Apr. 17, 2000.

* cited by examiner

ONLINE SYSTEM FOR RETAIL GAS SALES

BACKGROUND OF THE INVENTION

Field of the Invention

The invention relates generally to a method and system for online retail gas sales for future delivery.

SUMMARY OF THE INVENTION

This method and system enable purchasers to purchase gas online for future delivery at third-party retail gas stations. In accordance with an important aspect of the invention, online retail gas transactions may be handled by the oil company. The method and system require the purchaser to prepay the oil company for online purchases or have extended credit accepted by the oil company. Prepayments are credited into a purchaser's oil company account, while gas deliveries are debited from the purchaser's account. In order to make the retail gas station owner whole, the oil company pays the retail gas station for the taxes and agreed profit on the gas delivered to the purchaser and also replaces the gallons of gas delivered. The oil companies benefit with increased gas sales, increased profit and increased cash flow. Various embodiments of the invention are contemplated. The invention may require a purchaser to select a location of a retail gas station, a selected grade of gas, a combination of both or no pre-selection.

DESCRIPTION OF THE DRAWING

These and other advantages of the present invention will be readily understood with reference to the following specification and attached drawing wherein.

DETAILED DESCRIPTION

Figure 1A:
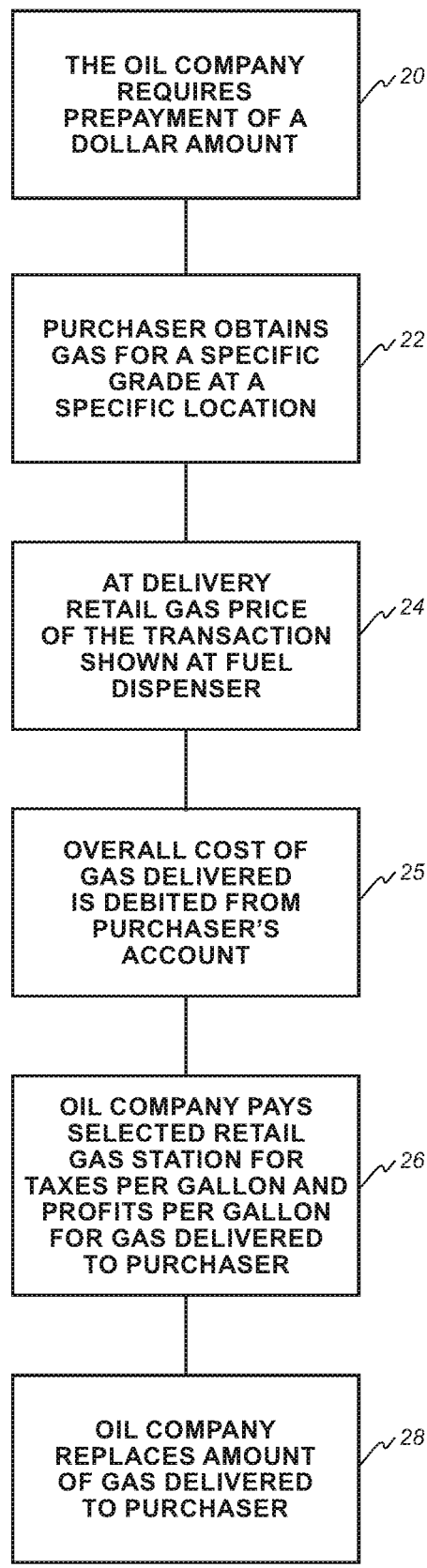
FIG. 1A is a block diagram of one embodiment of a method for online retail gas sales for future delivery.

A simplified block diagram of the method for an online gas sales system is shown in FIG. 1. As will be discussed in detail below, the oil company may control the transaction, unlike conventional retail gas transactions.

Multiple embodiments of the invention are set forth below.

No pre-selections by the purchaser

Purchaser selects location of the participating retail gas station

Purchaser selects grade of gas

Combination of both

In all embodiments, the purchaser must prepay for future deliveries of gas or have approved credit. Online gas purchaser's will be provided with a gas card that can used at fuel dispensers at retail gas stations. Alternatively, purchasers may be provided with an access code that allows them to take delivery of gas.

For brevity, only one embodiment of the invention is described and illustrated. That embodiment requires the purchaser to select the location of the participating retail gas station and the grade of gas for delivery. The other embodiments are well within the ordinary skill in the art.

As illustrated and described in detail below, the system and method enable purchasers to purchase gas online from an oil company for consumption at a participating retail gas station for a selected grade of gas for future delivery. As shown in step 20, the oil company may require that the purchaser prepay for online purchases or have been extended credit. The oil company may also require the purchaser to select a location of a retail gas station for delivery as well as a grade of gas.

Prepayments are credited to the purchaser's account with the oil company. Online purchasers can take delivery of gas from the selected retail gas station and the selected grade of gas (step 22) up to their account balance. The oil company may offer a discounted retail price per gallon by providing a discount on the wholesale price component, of a retail gallon of gas, for example, as discussed in detail in International Patent Application Publication No. PCT/US18/040020, hereby incorporated by reference. The oil company can alternatively provide a fixed discount, or an undiscounted retail price or a price that has been negotiated with the purchaser to arrive at a retail price. When the purchaser takes delivery, the retail price per gallon for the transaction is displayed at the fuel dispenser in accordance with a previous agreement with the oil company (step 24). In step 25, the purchaser's account with the oil company is debited for the cost of each delivery. In step 26, the oil company reimburses the retail gas station owner for the delivery paying the retail gas station owner for the taxes and the agreed upon profit on the gas delivered to the purchaser. In order to make the retail gas station owner whole, the oil company replaces the amount of gas delivered to the purchaser (step 28).

Figure 1B:
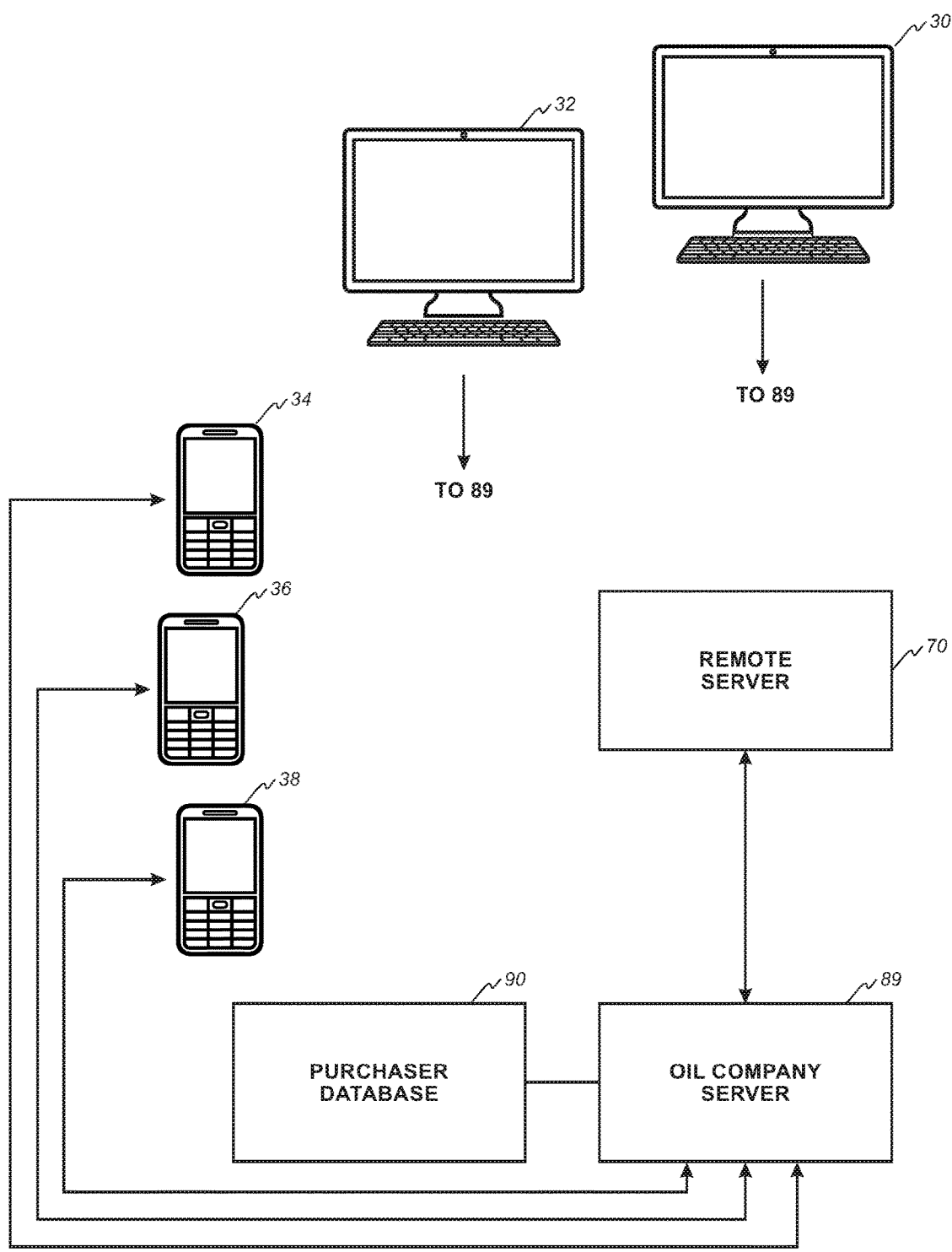
FIG. 1B is a simplified diagram of the method which illustrates purchaser access to the method and system for online retail gas purchases.

A simplified block diagram of the online retail gas sales method and system is illustrated in FIG. 1B. In order to purchase gas online for future delivery, purchasers must first access an oil company server 89 and establish an account and prepay for future gas deliveries or alternatively establish credit. The oil company server 89 can be accessed by way of personal computers 30, 32 or a smart phone 34, 36 and 38. The personal computers 30, 32 and the smart phones are programmed with an "app" to provide access the oil company server 89 to make prepayments. The app may also include an access code that can be read or input into an input device on a fuel dispenser that allows the purchaser's account information, maintained in a purchaser database 90 (FIG. 1B) to be accessed. The gas delivery transaction at a retail gas station is handled by the oil company by way of "back office" processing between the oil company server 89 that is in bi-directional communication with a remote server 70, affiliated with the retail gas station.

Once an account is established, online purchasers may be provided with an online retail gas card, e.g., a gift card, which may be refillable, or an access code which allows purchasers to access a fuel dispenser, for example, at a selected retail station for a selected grade of gas at delivery. Once access to the fuel dispenser is established, the system processes the transaction in a manner as discussed below.

As used herein, the following definitions apply.

Oil company refers to enterprises, such as Valero, Chevron, Exxon Mobil, BP, Shell and the like. This term also refers to wholesalers and distributors and other entities in the vertical supply chain.

Local taxes refer to all federal, state, county, and other taxes on a gallon of gas at a specified location for a specified grade of gas at the time of delivery. Taxes per gallon per gallon can vary extensively over a specified region.

Retail owner profits refers to the profit per gallon for the specified retail gas station owner for the specified grade of gas at the time of delivery. These profits can be negotiated between the oil company and the retail gas station owner or can be the normal profits per gallon for conventional retail gas sales. The negotiated profits can be different than profits per gallon for conventional non-online sales.

Current Retail gas price per gallon refers to the current price that a retail gas station sells a gallon of gas to customers for a specified grade of gas at a specified retail gas station at the time of delivery.

The retail price per gallon of the transaction is stored in the oil company database 90 and can be a discounted retail price based upon a discounted wholesale price component, as discussed above, or the undiscounted current retail price or other retail price that has been negotiated between the oil company.

Retail gas station. This refers to retail gas stations that sell gas to the general public that are individually owned or under the control of an oil company.

In one embodiment of the invention, the oil company provides online purchasers with a discounted retail price per gallon. The discount is based on a discounted wholesale price component per gallon. In particular, the retail price of gas per gallon is made up of several components; wholesale price per gallon component, local taxes per gallon component and dealer profit per gallon component. The oil company can only discount its wholesale price per gallon.

As discussed above, in order to reimburse the retail gas station owner for gas delivered to an online purchaser, the oil company can easily determine the taxes per gallon and the profits per gallon for example, as disclosed in detail in International Patent Application Publication No. PCT/US18/040020, hereby incorporated by reference. The wholesale price component per gallon for the delivery goes to oil company to reimburse the gas replaced by the oil company for the delivery.

In order to understand the operation of the invention, consider the following example. Assume that for the selected grade of gas at the selected retail gas station, the current retail price is $3.00 per gallon at the time of delivery. Further assume that the taxes per gallon are $0.90 per gallon and the profit per gallon is $0.10 per gallon. If an online purchaser takes delivery of 10 gallons of gas, the oil company will reimburse the retail gas station $10.00 for the taxes and profit associated with the delivery. The 10 gallons of gas consumed at the retail gas station are replaced by the oil company. In this example, the total cost of delivery of 10 gallons of gas at $3.00 per gallon is $30.00. Of that $30, $10 is paid to the retail gas station owner for taxes and profit, the remaining $20, or other discounted amount, is earned by the oil company to cover its wholesale gas component for the transaction. The entire amount is debited to the purchaser's oil company account.

Both retail gas station owner and the oil company benefit from the method described above. The retail gas station owner gets the benefit of increase gas profits due to the online sales and potentially increased sales of other retail items, such as food items and beverages, due to increased traffic through the station. The oil company will experience increased sales of the gas, increased profits and will have the benefits normally associated with gift cards, such as captive customers and increased cash flow.

Description of a Fuel Dispenser

Figure 2:
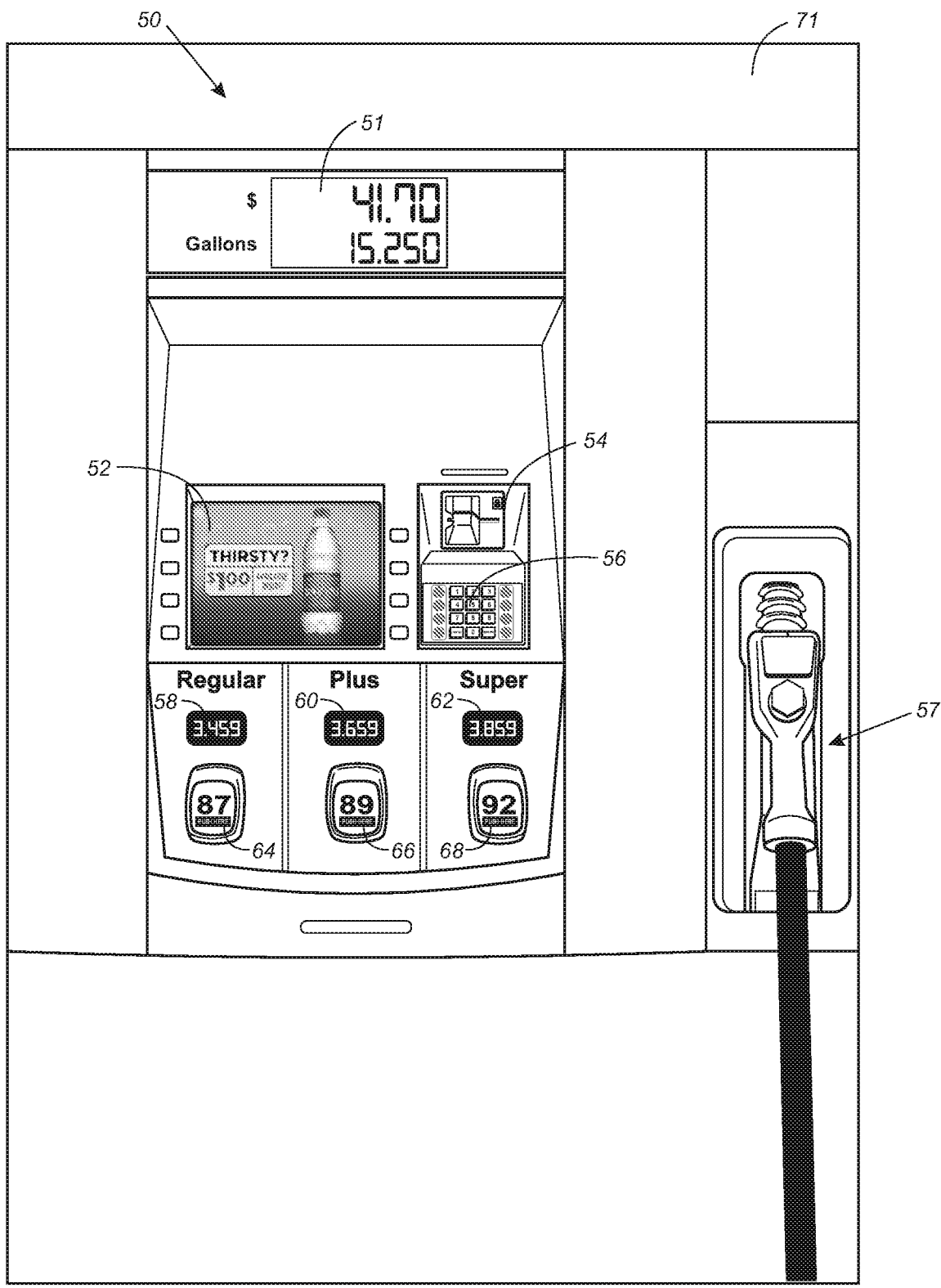
FIG. 2 is an elevation view of an exemplary fuel dispenser.

The method allows delivery of gas based upon online purchases to be made with minimal additional hardware. In particular, the invention can be implemented with an exemplary fuel dispenser, as illustrated in FIG. 2. The fuel dispenser, generally identified with the reference numeral 50, may include a main display 51 for displaying the number of gallons being delivered, the retail price per gallon and the cost of the transaction. An optional display 52 may be provided for advertising.

The fuel dispenser 50 also includes a first input device, for example, a magnetic card reader 54, for reading the purchaser's account data. A second input device in the form of a keyboard 56 may be provided for passwords, for example, purchaser zip codes or online purchaser's access codes. The fuel dispenser 50 may also include price displays 58, 60 and 62 for displaying the retail price per gallon for each of the different grades of gas. The desired grade of gas can be selected by selecting the corresponding paddle 64, 66 and 68 associated with the desired grade of gas. All of the devices discussed above are carried on a front panel of a freestanding housing 71. A handle 57 is provided for delivering gas.

Figure 3A:
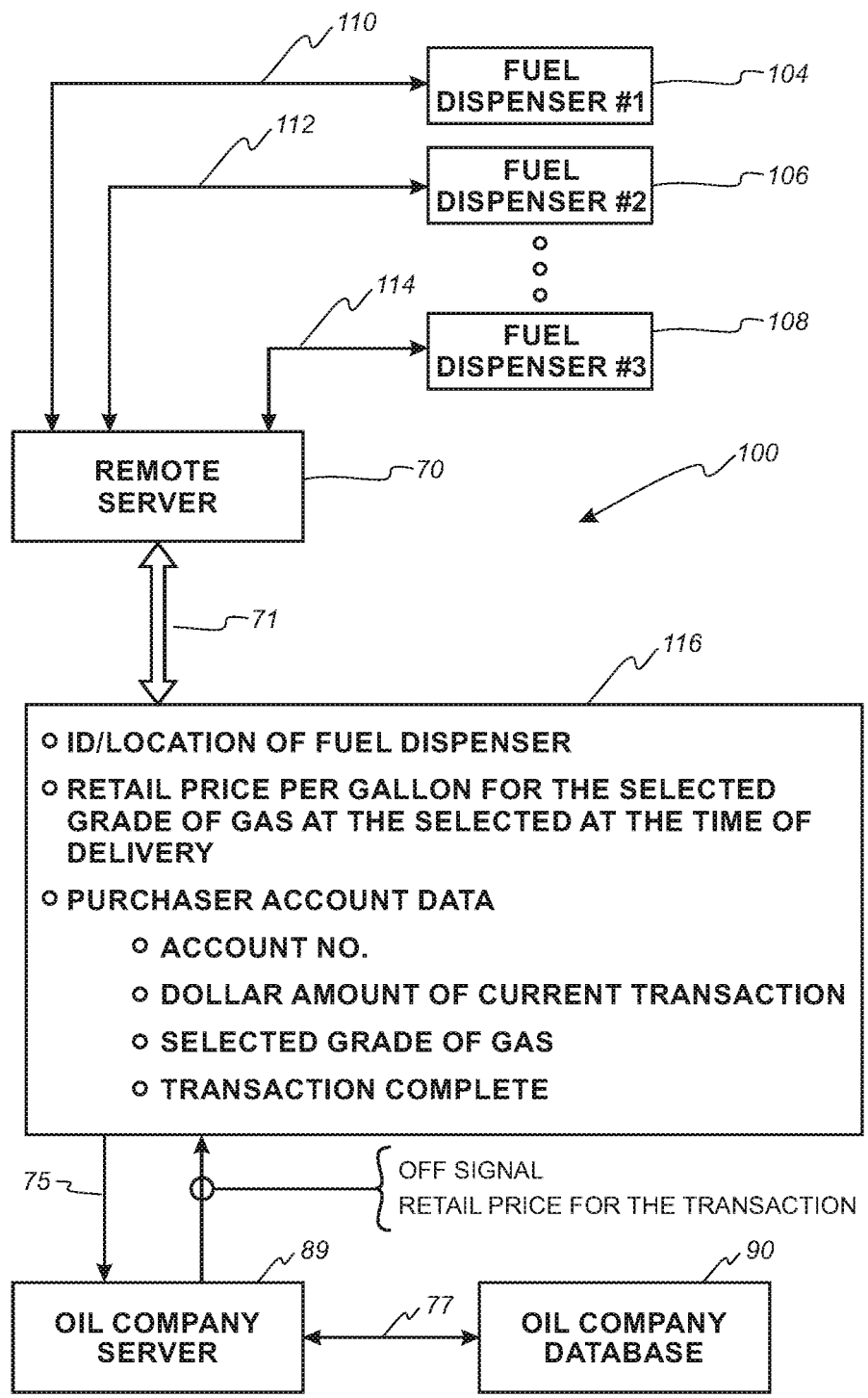
FIG. 3A is a block diagram of an exemplary system for implementing one embodiment of the online gas sales method, disclosed herein.

With reference to FIG. 3A, the invention may be implemented by an exemplary system 100 that includes at least one remote server 70 affiliated with the retail gas station and a persistent storage device 116. The system also requires an oil company server 89 and an oil company database 90. The remote server 70 is in communication with an oil company server 89 that controls the transaction.

As shown, one or more fuel dispensers 104, 106 and 108 may be in bidirectional communication with the remote server 70 by way of the communication links 110, 112 and 114. A bidirectional communication link 71 may be provided between the remote server 89 and the persistent storage device 116. The oil company server 89 may have read/write with respect to the persistent storage device 116 by way of a communication link 75. The oil company database 90 may be integral with the oil company server 89 or bidirectional communication may be provided between the two by way of a communication link 77.

The persistent storage device 116 receives and stores various data from the fuel dispenser 50 when a purchaser inserts a gas card or inputs an activation code. This data includes:

ID/Location of the fuel dispenser.
Retail gas price per gallon for the selected grade of gas at the selected retail gas station at the time of delivery.
Purchaser Account No.
Dollar amount of current transaction.
Selected grade of gas.

Transaction complete.

Prepayments for future gas deliveries are credited to the purchaser's account in the oil company database 90. Deliveries are debited from the purchaser's account. The oil company database 90 maintains the purchaser's current balance.

In operation, the purchasers account number is read by the fuel dispenser 50 and ported to the oil company server 89. The oil company server 89 uses the purchaser's account number to access the purchaser's account balance in the oil company database 89. Based on the retail price per gallon for the transaction, the purchaser's account balance is used to determine the maximum dollar amount of gas that can be delivered. The maximum dollar amount is ported back to the persistent storage device 116 and, in turn, to the fuel dispenser 50. to control the total amount of gas that can be delivered.

The fuel dispenser 50 (FIG. 3B) includes a mechanical system 55 and an electronic control system 53, housed in the housing 71. The mechanical system 55 includes a motor driven pump and electric valves (not shown) under the control of the electronic control system 53. An example of a conventional mechanical system 55 that includes a pump driven by an electric motor and various control valves for use in fuel dispensers is disclosed in U.S. Pat. Nos. 7,948, 376; 9,302,899; 9,139,414; and 9,082,248, hereby incorporated by reference.

The electronic control system 53 includes a computer processing unit (CPU) or microcontroller 57 and a memory device 59. The electronic control system 53 also includes a transceiver 61 for providing a bidirectional communication path with the remote server 70 and between the fuel dispensers 104, 106 and 108 by way of the communication links 110, 112 and 114. The electronic control system 53 includes control logic as used in conventional fuel dispensers and further includes the logic disclosed below to provide enable an oil company to process an online retail gas transaction as discussed herein.

The electronic control system 53 transmits the following data to the remote server 70:

Purchaser account no.
Location/ID of fuel dispenser
Current retail gas price per gallon for the selected grade of gas at the selected retail gas station at the time of delivery
Dollar amount of gallons pumped
Transaction complete
Grade of gas delivered The electronic control system 53 receives the following signals from the remote server 70:

On/Off control
Dollar amount of transaction
Retail price for the transaction

The remote server 70 includes a CPU 84 and a memory device 86. The remote server 70 may have access to a purchaser database 116, Data from the fuel dispenser 50 is received by the remote server 70 by way of the transceiver 82. This data is stored in the persistent storage device 116, as illustrated in FIG. 3A.

The remote server 70 transmits the following data to the oil company server 89:

Dollar amount of gallons pumped
Current retail price per gallon for the selected grade
Purchaser account no.
Location/ID of fuel dispenser
Transaction complete
Selected grade of gas Based upon receipt of the data above, the oil company server 89 checks the purchaser's account data in the oil company database 90 to determine the retail price that applies to the transaction. The retail price for the transaction may be a discounted retail price per gallon based upon a discounted wholesale price per gallon, as discussed above, undiscounted or negotiated. The oil company server 90 calculates retail price per gallon for the transaction based upon the taxes and profits per gallon and the discount applied to the online purchaser's transaction. The retail price per gallon can be based upon a discounted wholesale price per component per gallon set by the oil company or other discount.

The retail price for the transaction is used by the oil company server 89 to determine the maximum dollar by checking the purchaser's balance in the oil company database 90. The retail price for the transaction is transmitted to the remote server 70 and, in turn, to the fuel dispenser 50, where it is displayed. The maximum dollar amount is also transmitted to the remote server 70 to control the dollar amount of the gas delivered. Once the maximum dollar amount is reached, the oil company server 89 transmits an OFF signal to the remote server 70, which, in turn, is transmitted to the fuel dispenser 50 to terminate the delivery.

The remote server 70 transmits the following data to the fuel dispenser 104, 106 . . . 108 (FIG. 4A), where delivery is taken:

On/off control of the pump
Dollar amount of the transaction

Flow Charts

Figure 4:
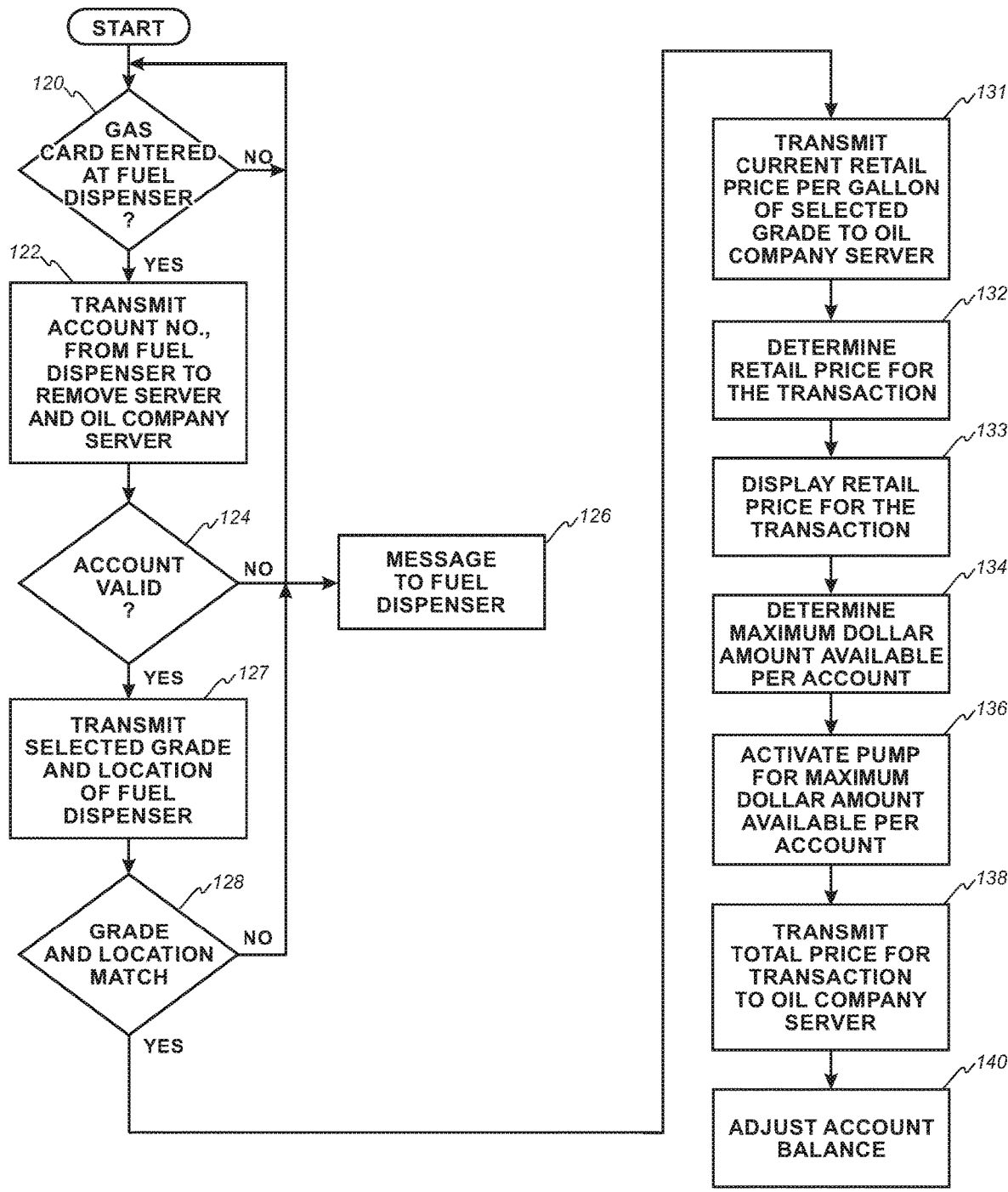
FIG. 4 is a simplified exemplary flow chart of the online retail gas system disclosed herein.

A simplified flow chart for the online gas sales method is illustrated in FIG. 4. It is to be understood that the sequence or order of steps is not limited to that shown in FIG. 4. Moreover, various embodiments are for online gas sales for future delivery. These embodiments all require prepayment or credit.

Referring to FIG. 4, a simplified exemplary flow chart for one embodiment of the online retail gas method and system is shown. Initially, the system waits in step 120 for a prepaid an online gas card to be read by an input device on the fuel dispenser 50 or an access code to be entered into an input device on the fuel dispenser 50. Once the online gas card is read or the online gas code is keyed into an input device on the fuel dispenser 50, the purchaser's account number is sent to the remote server 70 in step 122 and, in turn, to the oil company server 89. The oil company server 89 then determines if the purchaser account is valid in step 124. If the account is valid, the system proceeds to step 127 and transmits the selected grade and location of the fuel dispenser to the remote server 70, and, in turn to the oil company server 89 if this option is selected.

The oil company server 89 then checks in step 128 whether the retail gas station ID/location and the selected grade of gas match the selections by the purchaser. If not, the system returns to step 120. If there is a match, the transaction data including the current retail price per gallon, is transmitted to the oil company server 89. The oil company server 89 uses the current retail price per gallon to determine the taxes per gallon and the profit per gallon, as discussed above, or as otherwise agreed. The transaction data may also be used by the oil company server 89 to determine a discounted retail price per gallon based upon a discounted wholesale price component per gallon. Alternately, the retail price for the transaction may be based on an undiscounted retail price per gallon or a negotiated retail price per gallon.

The oil company server 89 looks up the purchaser's account data in the oil company database 90 to determine the appropriate retail price for the transaction in step 132 and transmits to the remote server, and, in turn, to the fuel dispenser. The retail price per gallon for the transaction may be displayed in step 133 at the fuel dispenser 50. The retail price per gallon for the transaction is used to determine the maximum dollar amount of gas that can be delivered in step 134. The maximum dollar amount is used by the oil company server 89 for comparison with the current dollar amount pumped.

Figure 3B:
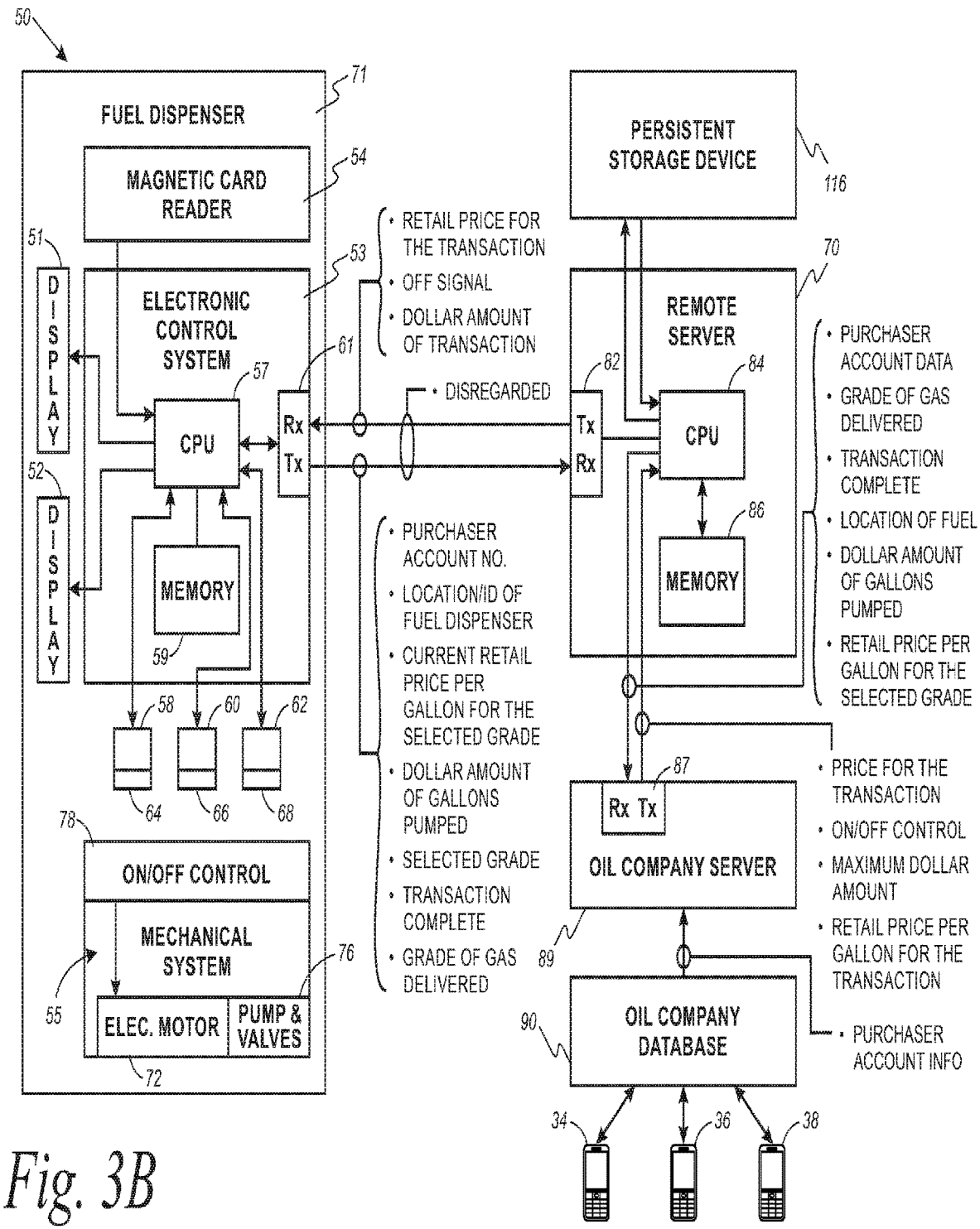
FIG. 3B is a more detailed block diagram of one embodiment of the online retail gas system disclosed herein.

In step 136, the oil company server 89 transmits an ON signal to the remote server 70 that is transmitted to the fuel dispenser 50 signals the electric motor 72 (FIG. 3B) at the fuel dispenser 50 (FIG. 2) to turn the electric motor 72 on up to the maximum dollar amount. Once the electric motor 72 is turned on, the oil company server 89, by way of the remote server 70, signals the fuel dispensers 104, 106 and 108 to display the current cost of the transaction in step 138. The dollar amount of the gallons pumped is transmitted to the oil company server 89. The oil company server 89 compares the current dollar amount of the gallons pumped with the maximum dollar amount. Once the current dollar amount of the gallons pumped equals the maximum dollar amount, an OFF signal is sent by the oil company server 89 to the remote server 70, which, in turn signals the fuel dispenser 50 to turn off the pump by way of the on/off control system 78 (FIG. 3B).

Alternatively, the pump may be turned off in response to a transaction complete signal from the fuel dispenser 50. In either case, the oil company server 89 adjusts the purchaser's account balance for the total dollars pumped and stores it in the purchaser database 90 in step 140.

Figure 5A:
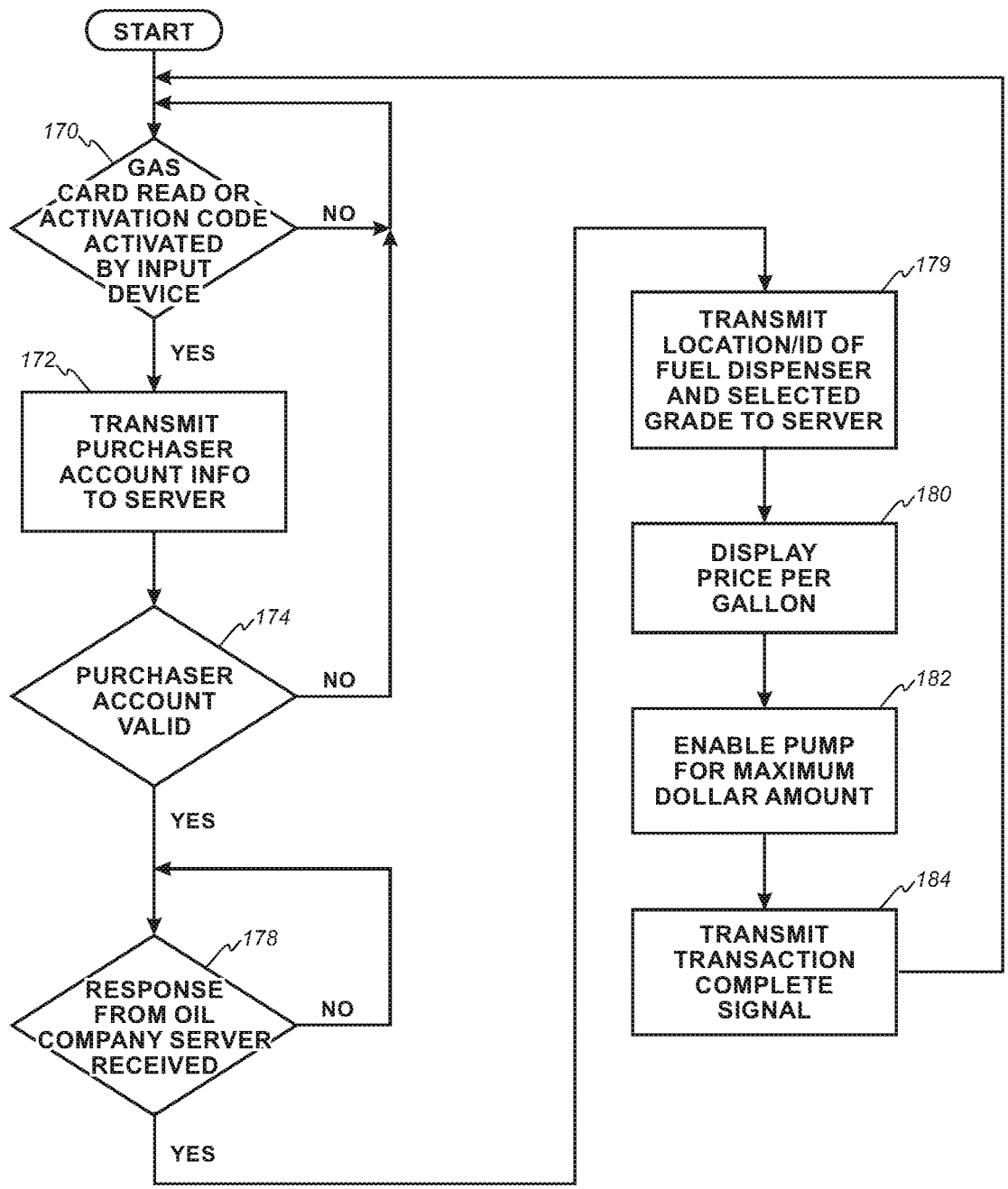
FIG. 5A is an exemplary flow chart for the fuel dispenser in connection with one embodiment of the online retail gas method and system disclosed herein.

An exemplary flow chart for a fuel dispenser 104, 106 and 108 is illustrated in FIG. 5A. Initially, the system waits in step 170 for online gas card to be received by an input device, such as, a magnetic card reader 54 or alternatively activated by an online access code. Once the online gas card is read or an online gas access code is detected by the CPU 57, the purchaser's account data is transmitted to the oil company server 89 by way of the remote server 89 in step 172. If the account is valid, the current retail price per gallon, location/ID of the fuel dispenser 50 and the selected grade of gas and the current retail price per gallon is transmitted to the oil company server 89 by way of the remote server 70 in step 172. The oil company server 89 reads the account number and checks the oil company database 90 in step 174 to determine whether the purchaser's account is valid. If the purchaser's account is not valid, returns to step 170 and awaits another gas card to be read or an activation code to be entered.

The fuel dispenser 50 awaits a response from the oil company server 89 by way of the remote server 70 in step 178 that the purchaser's account is valid. If so, the location/ID of the fuel dispenser and the selected grade are transmitted to the server in step 179. The retail price per gallon for the transaction is determined by the oil company server 89, as discussed above, and transmitted to the fuel dispenser 50 by way of the remote server 70 and displayed in step 180. Once the fuel dispenser 50 receives a ON signal from the oil company server 89 by way of the remote server 70, the electric motor 72 and electrically controlled valves 76 (FIG. 3B) are enabled up to maximum dollar amount based upon the balance in the purchaser's account in step 182. Once the purchaser stops pumping by releasing a manual lever in the handle 57, a manual shutoff is sensed, or the maximum dollar amount is reached, the electronic control system 53 transmits a transaction complete signal to the remote server 70 in step 184 and subsequently returns to step 170. This signal is transmitted to the oil company server 89, which debits the amount of the transaction in the purchaser database 90.

Figure 5B:
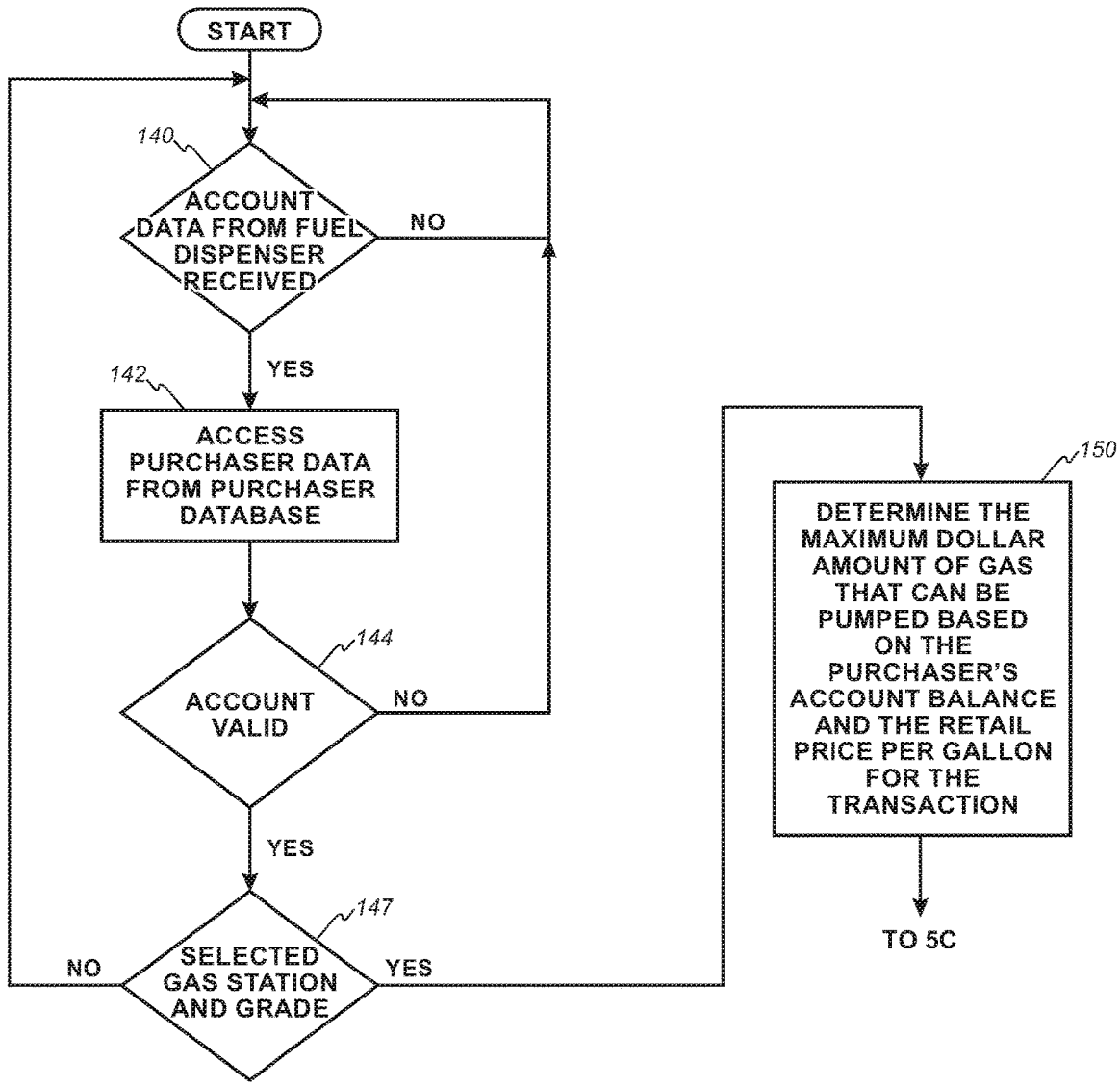
FIGS. 5B and 5C illustrate an exemplary flow chart of one embodiment of the invention for a remote server associated with the fuel dispenser in connection with the online retail gas system and an oil company server that shadows the remote server and controls the online purchase transaction described herein.
Figure 5C:
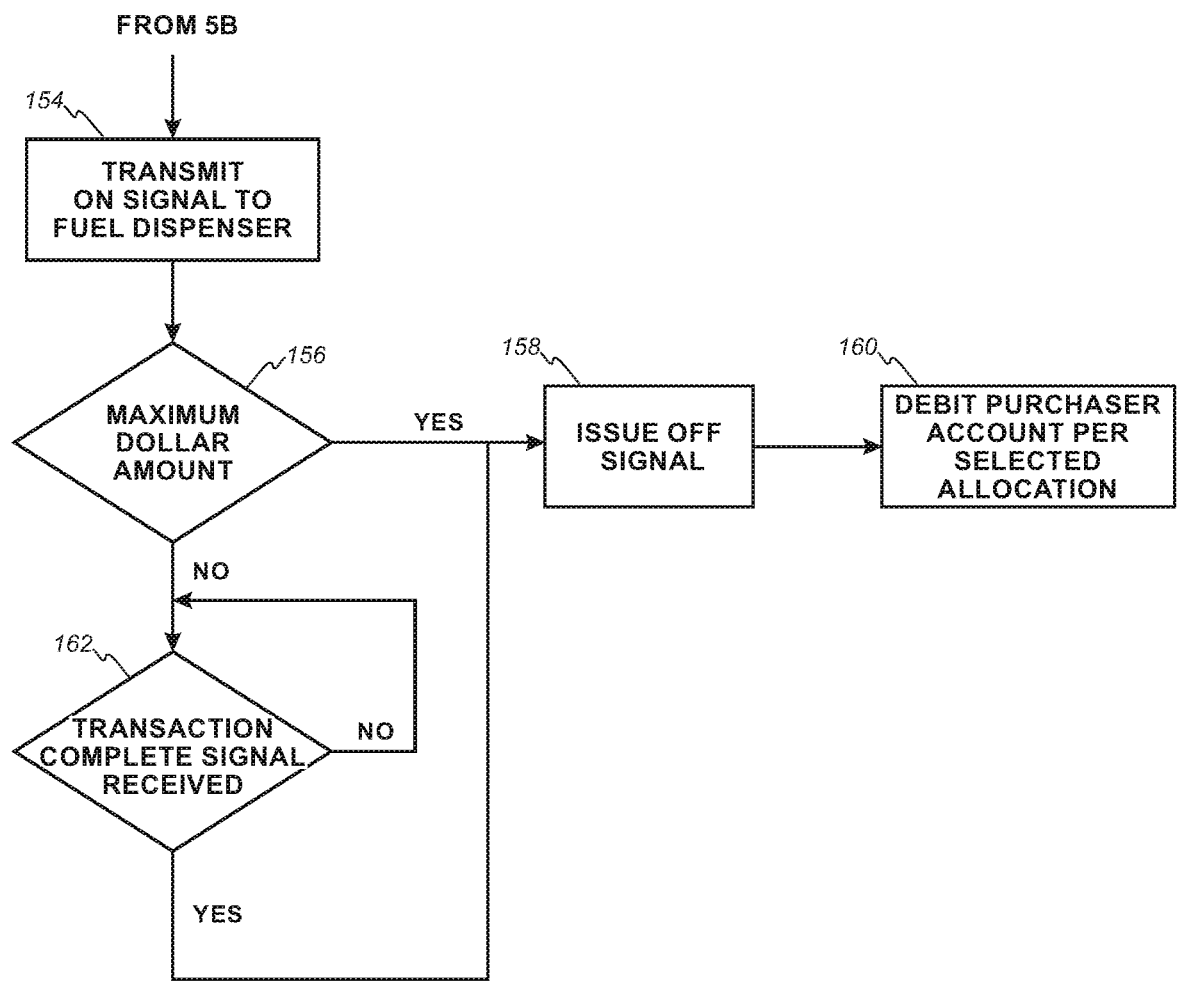

An exemplary flow chart for the remote server 70 is illustrated in FIGS. 5B and 5C. Initially, the remote server 70 awaits purchaser account data from the fuel dispenser 50 (FIG. 2) in step 140. This data is passed on to the oil company server 89. Once the purchaser's account data is received, the oil company server 89 looks up the purchaser's account data in the purchaser database (FIG. 3B) in step 142 and determines if the purchaser's account is valid in step 144. If the purchaser's account is not valid, the system returns to step 140 and awaits account data.

If the purchasers account is valid, the grade of gas, location/ID and current retail price per gallon for the selected grade is grabbed by the remote server 70 from the fuel dispenser 50 and pushed to the oil company server 89 and compared with the purchaser's previous selections in step 147.

If there is no match, the system returns to step 140. If there is a match, the location/ID of the retail gas station, current retail price per gallon and the selected grade of gas is used by the oil company server 89 to determine the taxes and profits per gallon and the retail price per gallon for the transaction, or as otherwise agreed. If the location of the retail gas station and the grade of gas match the purchaser's selections, the system proceeds to step 150 and determines the maximum dollar amount of gas that can be delivered based upon the purchaser's current account balance and the retail price for the transaction. The oil company server 89 transmits an ON signal to the fuel dispenser 50 by way of the remote server 70 in step 154.

Once the maximum dollar amount is reached, as indicated in step 156, the oil company server 89 signals sends an OFF signal to the remote server 70, a signal is sent to the fuel dispenser 50 to turn off the electric motor 72 in step 158. Alternatively, if the transaction is terminated at the fuel dispenser end by the purchaser or by an automatic shut off based upon the gas tank being full, the fuel dispenser 50 issues a Transaction Complete signal to the server 70 in step 162, which is retransmitted to the oil company server 89. Upon receipt of the transaction complete signal or a signal that the maximum dollar amount has been reached, the oil company server 89 by way of the remote server 70 issues an OFF signal to the fuel dispenser 50 in step 158. In step 160, the oil company server 89 debits the purchaser's account for the dollar amount of the gas pumped. The total number of gallons pumped, and total price displayed at the fuel dispenser 50.

An important aspect of the method described above is that the oil company controls the entire transaction. More specifically, each transaction may be handled by the oil company by way of "back office" processing that takes over the control of the retail gas station equipment including the fuel dispenser 50 and the remote server 70. The method is analogous to a system used by telecommunication utilities, such as Verizon and the like, to share their cell towers by leasing them to other telecommunication companies. In the method described herein, the oil companies share the fuel dispenser and retail gas station remote server 70.

The method described herein enables oil companies to sell gas to retail customers in a manner heretofore unknown. With the growing trend toward online sales of consumer products, online gas sales are a practical addition to online sales of consumer products, thus integrating the claims below into a practical application.

Obviously, many modifications and variations of the present invention are possible in light of the above teachings. For example, the invention may require a purchaser to select a location of a retail gas station, a selected grade of gas or a combination of both. Thus, it is to be understood that, within the scope of the appended claims, the invention may be practiced otherwise than as specifically described above.

I claim:

1. A method for enabling enterprise online retail gas sales for future delivery at third party retail gas stations, comprising the steps of:
   (a) storing on online purchasers accounts for purchase of gas online from an enterprise by way of an enterprise server for future delivery at third party retail gas stations by said enterprise, defining online purchasers' accounts;
   (b) controlling a fuel dispenser capable of delivering gas at third-party retail gas stations to online purchasers with prepaid accounts, said fuel dispenser having an electronic control system and a mechanical control system which includes an electric motor, pumps and valves for selectively pumping gas in response to control signal from an enterprise server that enables the mechanical control system to enable said third party fuel dispenser to dispense gas by way of said electric motor and said pump and valves to said online purchaser up to a purchasers' current balance in said to an online purchasers' prepaid accounts;
   (c) said enterprise reimbursing the third-party retail gas station owner for taxes and profits per gallon for an amount of gas delivered to said online purchasers, where realizing a profit based on the difference between a replacement cost of the gas and the wholesale price;
   (d) said enterprise replacing gas delivered by said third-party retail gas station to said online purchasers for the amount of gas delivered by said enterprise; and (e) said enterprise debiting the online purchasers' prepaid accounts for a cost of gas delivered.

2. The method as recited in claim 1, wherein step (a) further includes the step of: storing a retail gas station location for gas purchases preselected by said online purchaser in said online purchaser's account.

3. The method as recited in claim 1, wherein step (a) further includes the step of: storing a grade of gas type for gas purchases preselected by said online purchaser in said online purchasers account.

4. A system for enabling enterprise retail gas sales to online purchasers to purchase gas for future delivery from an enterprise by way of an enterprise server for future delivery at third-party retail gas stations, comprising: at least one enterprise server and at least one enterprise database;
   said at least one enterprise server programmed to: store online purchaser accounts, which include the purchasers' current account balance, on said at least one enterprise database;
   control at least one fuel dispenser at said third party retail gas station for delivering gas to online purchasers with prepaid accounts, said fuel dispenser having an electronic control system and a mechanical control system which includes an electric motor, pumps and valves for selectively pumping gas in response to a control signal from said enterprise server that causes the mechanical control system to dispense gas by way of said electric motor and said pump and valves to said online purchaser up to a purchasers' current balance in said online purchasers' prepaid accounts;
   reimbursing said third-party retail gas station owner for taxes and profits per gallon for the amount of gas delivered to said online purchasers; and
   said enterprise replacing the amount of gas to said third party retail gas station owner for the amount of gas delivered to said online purchaser, where realizing a profit based on the difference between a replacement cost of the gas said retail gas station by said enterprise.

5. The system as recited in claim 4, wherein said at least one enterprise server is configured to enable delivery of gas to said online purchasers at a discount.

6. The system as recited in claim 4, wherein said at least one enterprise server is configured to enable delivery of gas to said online purchasers at a discount based on the a wholesale price of gas per gallon.

7. The system as recited in claim 4, wherein said at least one enterprise server is configured to enable delivery of gas to said online purchasers for a preselected grade of gas by said online purchasers.

8. The system as recited in claim 4, wherein said at least one enterprise server is configured to enable delivery of gas to said online purchasers at a preselected retail gas station location.

9. The system as recited in claim 4, wherein said at least one enterprise server is configured to enable delivery of gas to said online purchasers at a preselected retail gas station location and a preselected grade of gas.

\* \* \* \* \*